US007541318B2

(12) United States Patent
Weaver et al.

(10) Patent No.: US 7,541,318 B2
(45) Date of Patent: *Jun. 2, 2009

(54) ON-THE-FLY PREPARATION OF PROPPANT AND ITS USE IN SUBTERRANEAN OPERATIONS

(75) Inventors: Jimmie D. Weaver, Duncan, OK (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 386 days.

This patent is subject to a terminal disclaimer.

(21) Appl. No.: 10/853,879

(22) Filed: May 26, 2004

(65) Prior Publication Data

US 2005/0267001 A1 Dec. 1, 2005

(51) Int. Cl.
*E21B 43/267* (2006.01)
*C09K 8/62* (2006.01)
*B01F 3/12* (2006.01)

(52) U.S. Cl. .................... 507/219; 166/308.2; 507/220; 507/224; 507/924; 516/9

(58) Field of Classification Search ................. 507/924, 507/219, 220, 224; 166/308.2; 516/9
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,052,298 A | 9/1962 | Malott | |
| 3,070,165 A | 12/1962 | Stratton | |
| 3,123,138 A | 3/1964 | Robichaux | 166/33 |
| 3,173,484 A | 3/1965 | Huitt et al. | |
| 3,176,768 A | 4/1965 | Brandt et al. | 166/33 |
| 3,195,635 A | 7/1965 | Fast | |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,302,719 A | 2/1967 | Fischer | |
| 3,308,885 A | 3/1967 | Sandiford | 166/33 |
| 3,308,886 A | 3/1967 | Evans | |
| 3,316,965 A | 5/1967 | Watanabe | 166/33 |
| 3,329,204 A | 7/1967 | Brieger | |
| 3,336,980 A | 8/1967 | Rike | 166/295 |
| 3,364,995 A | 1/1968 | Atkins et al. | |
| 3,366,178 A | 1/1968 | Malone et al. | |
| 3,375,872 A | 4/1968 | McLaughlin et al. | 166/29 |
| 3,378,074 A | 4/1968 | Kiel | |
| 3,404,735 A | 10/1968 | Young et al. | 166/33 |
| 3,415,320 A | 12/1968 | Young | 166/33 |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,492,147 A | 1/1970 | Young et al. | 117/62.2 |
| 3,525,398 A | 8/1970 | Fisher | |
| 3,565,176 A | 2/1971 | Clifford | |
| 3,592,266 A | 7/1971 | Tinsley | 166/283 |
| 3,659,651 A | 5/1972 | Graham | 166/280 |
| 3,681,287 A | 8/1972 | Brown et al. | 260/67 |
| 3,708,013 A | 1/1973 | Dismuke | 166/276 |
| 3,709,298 A | 1/1973 | Pramann | 166/276 |
| 3,709,641 A * | 1/1973 | Sarem | 425/7 |
| 3,741,308 A | 6/1973 | Veley | |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,769,070 A | 10/1973 | Schilt | |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,850,247 A | 11/1974 | Tinsley | 166/280 |
| 3,854,533 A | 12/1974 | Gurley et al. | 166/276 |
| 3,857,444 A | 12/1974 | Copeland | 166/276 |

(Continued)

FOREIGN PATENT DOCUMENTS

CA 2063877 9/1992

(Continued)

OTHER PUBLICATIONS

S. W. Almond, et al., "*Factors Affecting Proppant Flowback with Resin Coated Proppants*," Society of Petroleum Engineers, Inc., SPE 30096, p. 171-186, 1995.

(Continued)

*Primary Examiner*—Timothy J Kugel
(74) *Attorney, Agent, or Firm*—Robert A. Kent; Baker Botts LLP

(57) ABSTRACT

The present invention relates to methods for making proppants on-the-fly during subterranean treatment operations. Some embodiments of the present invention provide methods of preparing proppant on-the-fly comprising providing discrete amounts of a resin mixture that comprises a resinous material and a filler material; placing the discrete amounts of resin mixture into a well bore comprising a treatment fluid; and, allowing the discrete amounts of the resin mixture to substantially cure and form proppant particles while inside the treatment fluid. Other embodiments of the present invention provide methods of fracturing a portion of a subterranean formation using proppant prepared on-the-fly.

25 Claims, No Drawings

U.S. PATENT DOCUMENTS

| | | | |
|---|---|---|---|
| 3,861,467 A | 1/1975 | Harnsberger | |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,933,205 A | 1/1976 | Kiel | 166/308 |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,000,781 A | 1/1977 | Knapp | |
| 4,008,763 A | 2/1977 | Lowe et al. | 166/253 |
| 4,015,995 A | 4/1977 | Hess | 106/287 |
| 4,018,285 A | 4/1977 | Watkins et al. | |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,060,988 A * | 12/1977 | Arnold | 60/641.2 |
| 4,068,718 A | 1/1978 | Cooke, Jr. et al. | |
| 4,070,865 A | 1/1978 | McLaughlin | 61/36 |
| 4,074,760 A | 2/1978 | Copeland et al. | 166/276 |
| 4,085,801 A | 4/1978 | Sifferman | 166/295 |
| 4,085,802 A | 4/1978 | Sifferman et al. | |
| 4,089,437 A | 5/1978 | Chutter et al. | |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,247,430 A | 1/1981 | Constien | |
| 4,259,205 A | 3/1981 | Murphey | |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,392,988 A * | 7/1983 | Dobson et al. | 502/10 |
| 4,399,866 A | 8/1983 | Dearth | |
| 4,415,805 A | 11/1983 | Fertl et al. | 250/260 |
| 4,428,427 A | 1/1984 | Friedman | |
| 4,439,489 A | 3/1984 | Johnson et al. | 428/404 |
| 4,441,556 A | 4/1984 | Powers et al. | |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,585,064 A | 4/1986 | Graham et al. | |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,670,501 A | 6/1987 | Dymond et al. | |
| 4,675,140 A | 6/1987 | Sparks et al. | 264/4.3 |
| 4,681,165 A | 7/1987 | Bannister | |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,772,646 A | 9/1988 | Harms et al. | |
| 4,777,200 A | 10/1988 | Dymond et al. | |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,070 A | 6/1989 | Sharp | |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,875,525 A | 10/1989 | Mana | |
| 4,886,354 A | 12/1989 | Welch et al. | 356/70 |
| 4,888,240 A | 12/1989 | Graham et al. | 428/403 |
| 4,892,147 A * | 1/1990 | Jennings et al. | 166/280.2 |
| 4,895,207 A | 1/1990 | Friedman et al. | 166/276 |
| 4,898,750 A | 2/1990 | Friedman et al. | |
| 4,903,770 A | 2/1990 | Friedman et al. | 166/288 |
| 4,921,576 A | 5/1990 | Hurd | |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,984,635 A | 1/1991 | Cullick et al. | |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,056,597 A | 10/1991 | Stowe, III et al. | |
| 5,082,056 A | 1/1992 | Tackett, Jr. | 166/295 |
| 5,095,987 A | 3/1992 | Weaver et al. | |
| 5,105,886 A | 4/1992 | Strubhar | 166/280 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,244,362 A | 9/1993 | Conally et al. | |
| 5,247,059 A | 9/1993 | Gruber et al. | 528/354 |
| 5,249,627 A | 10/1993 | Harms et al. | |
| 5,249,628 A | 10/1993 | Surjaatmadja | 166/305 |
| 5,256,729 A | 10/1993 | Kutts et al. | 524/700 |
| 5,265,678 A | 11/1993 | Grundmann | |
| 5,273,115 A | 12/1993 | Spafford | 166/281 |
| 5,278,203 A | 1/1994 | Harms | |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |

| Patent No. | Date | Inventor | Class |
|---|---|---|---|
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmajda et al. | 175/67 |
| 5,363,916 A | 11/1994 | Himes et al. | 166/276 |
| 5,373,901 A | 12/1994 | Norman et al. | 166/300 |
| 5,377,756 A | 1/1995 | Northrop et al. | |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,390,741 A | 2/1995 | Payton et al. | |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,403,822 A | 4/1995 | Mueller et al. | 507/138 |
| 5,420,174 A | 5/1995 | Dewprashad | |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,177 A | 2/1996 | Yeh et al. | |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/219 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,663,123 A | 9/1997 | Goodhue, Jr. et al. | |
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,697,448 A | 12/1997 | Johnson | |
| 5,698,322 A | 12/1997 | Tsai et al. | 428/373 |
| 5,701,956 A | 12/1997 | Hardy et al. | |
| 5,712,314 A | 1/1998 | Surles et al. | 521/41 |
| 5,732,364 A | 3/1998 | Kalb et al. | 588/8 |
| 5,738,136 A | 4/1998 | Rosenberg | |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Suries | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,836,393 A | 11/1998 | Johnson | |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,901,789 A | 5/1999 | Donnelly et al. | |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,944,106 A | 8/1999 | Dalrymple et al. | |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,877 A | 10/1999 | Funkhouser et al. | 523/270 |
| 5,960,878 A | 10/1999 | Nguyen et al. | |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,969,823 A | 10/1999 | Wurz et al. | |
| 5,977,283 A | 11/1999 | Rossitto | 528/44 |
| 5,994,785 A | 11/1999 | Higuchi et al. | 527/789 |
| RE36,466 E * | 12/1999 | Nelson et al. | 166/280.2 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,063,738 A | 5/2000 | Chatterji et al. | |
| 6,068,055 A | 5/2000 | Chatterji et al. | 166/293 |
| 6,069,117 A | 5/2000 | Onan et al. | 507/202 |
| 6,070,667 A | 6/2000 | Gano | |
| 6,074,739 A | 6/2000 | Katagiri | 428/323 |
| 6,079,492 A * | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,131,661 A | 10/2000 | Conner et al. | |

| | | | | | | | |
|---|---|---|---|---|---|---|---|
| 6,135,987 | A | 10/2000 | Tsai et al. ............... 604/365 | 6,440,255 | B1 | 8/2002 | Kohlhammer et al. ....... 156/283 |
| 6,140,446 | A | 10/2000 | Fujiki et al. ................ 528/15 | 6,446,727 | B1 | 9/2002 | Zemlak et al. ............... 166/308 |
| 6,143,698 | A | 11/2000 | Murphey et al. | 6,448,206 | B1 | 9/2002 | Griffith et al. ............. 507/219 |
| 6,148,911 | A | 11/2000 | Gipson et al. ............... 166/248 | 6,450,260 | B1 | 9/2002 | James et al. ................ 166/277 |
| 6,152,234 | A | 11/2000 | Newhouse et al. ........... 166/403 | 6,454,003 | B1 | 9/2002 | Chang et al. ................ 166/270 |
| 6,162,766 | A | 12/2000 | Muir et al. ................. 507/267 | 6,457,518 | B1 | 10/2002 | Castano-Mears et al. |
| 6,165,947 | A | 12/2000 | Chang et al. | 6,458,885 | B1 | 10/2002 | Stengal et al. ............... 524/507 |
| 6,169,058 | B1 | 1/2001 | Le et al. ..................... 507/222 | 6,478,092 | B2 | 11/2002 | Voll et al. |
| 6,172,011 | B1 | 1/2001 | Card et al. .................. 507/204 | 6,485,947 | B1 | 11/2002 | Rajgarhia et al. ........... 435/139 |
| 6,172,077 | B1 | 1/2001 | Curtis et al. ................ 514/278 | 6,488,091 | B1 | 12/2002 | Weaver et al. ............... 166/300 |
| 6,176,315 | B1 | 1/2001 | Reddy et al. ............... 166/295 | 6,488,763 | B2 | 12/2002 | Brothers et al. ............. 106/692 |
| 6,177,484 | B1 | 1/2001 | Surles ......................... 523/131 | 6,494,263 | B2 | 12/2002 | Todd ........................... 166/312 |
| 6,184,311 | B1 | 2/2001 | O'Keefe et al. ............. 525/438 | 6,503,870 | B2 | 1/2003 | Griffith et al. ............... 507/219 |
| 6,186,228 | B1 | 2/2001 | Wegener et al. | 6,508,305 | B1 | 1/2003 | Brannon et al. ............. 166/293 |
| 6,187,834 | B1 | 2/2001 | Thayer et al. ................ 522/15 | 6,510,896 | B2 | 1/2003 | Bode et al. |
| 6,187,839 | B1 | 2/2001 | Eoff et al. ................... 523/130 | 6,520,255 | B2 | 2/2003 | Tolman et al. |
| 6,189,615 | B1 | 2/2001 | Sydansk ..................... 166/270 | 6,527,051 | B1 | 3/2003 | Reddy et al. ................ 166/300 |
| 6,192,985 | B1 | 2/2001 | Hinkel et al. ............... 166/280 | 6,528,157 | B1 | 3/2003 | Hussain et al. .............. 428/325 |
| 6,192,986 | B1 | 2/2001 | Urlwin-Smith ............. 166/295 | 6,531,427 | B1 | 3/2003 | Shuchart et al. ............. 507/267 |
| 6,196,317 | B1 | 3/2001 | Hardy ......................... 166/295 | 6,534,449 | B1 | 3/2003 | Gilmour et al. |
| 6,202,751 | B1 | 3/2001 | Chatterji et al. ............. 166/276 | 6,536,939 | B1 | 3/2003 | Blue |
| 6,209,643 | B1 | 4/2001 | Nguyen et al. .............. 166/276 | 6,538,576 | B1 | 3/2003 | Schultz et al. ........... 340/859.6 |
| 6,209,644 | B1 | 4/2001 | Brunet ......................... 166/297 | 6,543,545 | B1 | 4/2003 | Chatterji et al. ............. 166/381 |
| 6,209,646 | B1 | 4/2001 | Reddy et al. ............... 166/300 | 6,550,959 | B2 | 4/2003 | Huber et al. |
| 6,210,471 | B1 | 4/2001 | Craig ...................... 106/31.08 | 6,552,333 | B1 | 4/2003 | Storm et al. ............. 250/269.3 |
| 6,214,773 | B1 | 4/2001 | Harris et al. ................ 507/271 | 6,554,071 | B1 | 4/2003 | Reddy et al. ................ 166/293 |
| 6,231,664 | B1 | 5/2001 | Chatterji et al. ............. 106/724 | 6,555,507 | B2 | 4/2003 | Chatterji et al. ............. 507/219 |
| 6,234,251 | B1 | 5/2001 | Chatterji et al. ............. 166/295 | 6,569,814 | B1 | 5/2003 | Brady et al. ................. 507/201 |
| 6,238,597 | B1 | 5/2001 | Yim et al. .................... 252/512 | 6,582,819 | B2 | 6/2003 | McDaniel et al. ........... 428/402 |
| 6,241,019 | B1 | 6/2001 | Davidson et al. ............ 166/249 | 6,588,926 | B2 | 7/2003 | Huber et al. |
| 6,242,390 | B1 | 6/2001 | Mitchell et al. ............. 507/211 | 6,588,928 | B2 | 7/2003 | Huber et al. |
| 6,244,344 | B1 | 6/2001 | Chatterji et al. ............. 166/295 | 6,593,402 | B2 | 7/2003 | Chatterji et al. ................ 524/7 |
| 6,257,335 | B1 | 7/2001 | Nguyen et al. .............. 166/280 | 6,599,863 | B1 | 7/2003 | Palmer et al. ............... 507/219 |
| 6,260,622 | B1 | 7/2001 | Blok et al. ............... 166/305.1 | 6,608,162 | B1 | 8/2003 | Chiu et al. ................... 528/129 |
| 6,271,181 | B1 | 8/2001 | Chatterji et al. ............. 507/219 | 6,609,578 | B2 | 8/2003 | Patel et al. |
| 6,274,650 | B1 | 8/2001 | Cui .............................. 523/457 | 6,616,320 | B2 | 9/2003 | Huber et al. ............. 366/156.2 |
| 6,279,652 | B1 | 8/2001 | Chatterji et al. ............. 166/194 | 6,620,857 | B2 | 9/2003 | Valet ............................. 522/42 |
| 6,279,656 | B1 | 8/2001 | Sinclair et al. .............. 166/310 | 6,626,241 | B2 | 9/2003 | Nguyen ....................... 166/278 |
| 6,283,214 | B1 | 9/2001 | Guinot et al. ................ 166/297 | 6,632,527 | B1 | 10/2003 | McDaniel et al. ........... 428/402 |
| 6,302,207 | B1 | 10/2001 | Nguyen et al. .............. 166/276 | 6,632,778 | B1 | 10/2003 | Ayoub et al. |
| 6,306,998 | B1 | 10/2001 | Kimura et al. ................ 528/12 | 6,632,892 | B2 | 10/2003 | Rubinsztajn et al. ........ 525/476 |
| 6,310,008 | B1 | 10/2001 | Rietjens | 6,642,309 | B2 | 11/2003 | Komitsu et al. ............. 525/100 |
| 6,311,773 | B1 | 11/2001 | Todd et al. .................. 166/280 | 6,648,501 | B2 | 11/2003 | Huber et al. ................. 366/301 |
| 6,315,040 | B1 | 11/2001 | Donnelly | 6,659,179 | B2 | 12/2003 | Nguyen ....................... 166/227 |
| 6,321,841 | B1 | 11/2001 | Eoff et al. ................... 166/291 | 6,664,343 | B2 | 12/2003 | Narisawa et al. ............ 525/474 |
| 6,323,307 | B1 | 11/2001 | Bigg et al. ................... 528/354 | 6,667,279 | B1 | 12/2003 | Hessert et al. ............... 507/225 |
| 6,326,458 | B1 | 12/2001 | Gruber et al. ............... 528/354 | 6,668,926 | B2 | 12/2003 | Nguyen et al. .............. 166/280 |
| 6,328,105 | B1 | 12/2001 | Betzold ....................... 166/280 | 6,669,771 | B2 | 12/2003 | Tokiwa et al. ............ 106/162.7 |
| 6,328,106 | B1 | 12/2001 | Griffith et al. ............... 166/295 | 6,677,426 | B2 | 1/2004 | Noro et al. |
| 6,330,916 | B1 | 12/2001 | Rickards et al. ............. 166/280 | 6,681,856 | B1 | 1/2004 | Chatterji et al. ............. 166/294 |
| 6,330,917 | B2 | 12/2001 | Chatterji et al. ............. 166/295 | 6,686,328 | B1 | 2/2004 | Binder ......................... 510/446 |
| 6,342,467 | B1 | 1/2002 | Chang et al. | 6,705,400 | B1 | 3/2004 | Nugyen et al. .............. 166/281 |
| 6,350,309 | B2 | 2/2002 | Chatterji et al. ............. 106/677 | 6,705,440 | B2 | 3/2004 | Nugyen et al. |
| 6,357,527 | B1 | 3/2002 | Norman et al. .............. 166/300 | 6,710,019 | B1 | 3/2004 | Sawdon et al. .............. 507/136 |
| 6,364,018 | B1 | 4/2002 | Brannon et al. .......... 166/280.2 | 6,713,170 | B1 | 3/2004 | Kaneka et al. ............... 428/323 |
| 6,364,945 | B1 | 4/2002 | Chatterji et al. ............. 106/677 | 6,725,926 | B2 | 4/2004 | Nguyen et al. ........... 166/254.1 |
| 6,367,165 | B1 | 4/2002 | Huttlin ........................... 34/582 | 6,725,930 | B2 | 4/2004 | Boney et al. |
| 6,367,549 | B1 | 4/2002 | Chatterji et al. ............. 166/295 | 6,725,931 | B2 | 4/2004 | Nguyen et al. ........... 166/280.2 |
| 6,372,678 | B1 | 4/2002 | Youngsman et al. ........ 501/128 | 6,729,404 | B2 | 5/2004 | Nguyen et al. ........... 166/280.2 |
| 6,376,571 | B1 | 4/2002 | Chawla et al. ................ 522/64 | 6,729,405 | B2 | 5/2004 | DiLullo et al. |
| 6,387,986 | B1 | 5/2002 | Moradi-Araghi et al. .... 523/211 | 6,732,800 | B2 | 5/2004 | Acock et al. ................ 166/308 |
| 6,390,195 | B1 | 5/2002 | Nguyen et al. .............. 166/276 | 6,745,159 | B1 * | 6/2004 | Todd et al. ..................... 703/10 |
| 6,394,181 | B2 | 5/2002 | Schnatzmeyer et al. | 6,749,025 | B1 | 6/2004 | Brannon et al. .......... 166/305.1 |
| 6,401,817 | B1 | 6/2002 | Griffith et al. ............... 166/295 | 6,763,888 | B1 | 7/2004 | Harris et al. .............. 166/305.1 |
| 6,405,796 | B1 | 6/2002 | Meyer et al. | 6,766,858 | B2 | 7/2004 | Nguyen et al. .............. 166/300 |
| 6,405,797 | B2 | 6/2002 | Davidson et al. ............ 166/249 | 6,776,235 | B1 | 8/2004 | England ....................... 166/271 |
| 6,406,789 | B1 * | 6/2002 | McDaniel et al. ........... 428/402 | 6,776,236 | B1 | 8/2004 | Nguyen ....................... 166/279 |
| 6,408,943 | B1 | 6/2002 | Schultz et al. ............... 166/285 | 6,832,650 | B2 | 12/2004 | Nguyen et al. .............. 166/279 |
| 6,415,509 | B1 | 7/2002 | Echols et al. | 6,832,655 | B2 | 12/2004 | Ravensbergen et al. |
| 6,422,183 | B1 | 7/2002 | Kato | 6,837,309 | B2 | 1/2005 | Boney et al. |
| 6,422,314 | B1 | 7/2002 | Todd et al. .................. 166/312 | 6,851,474 | B2 | 2/2005 | Nguyen ....................... 166/279 |
| 6,439,309 | B1 | 8/2002 | Matherly et al. ............ 166/276 | 6,866,099 | B2 | 3/2005 | Nguyen |
| 6,439,310 | B1 | 8/2002 | Scott, III et al. ............. 166/308 | 6,881,709 | B2 | 4/2005 | Nelson et al. |

| Patent Number | Date | Inventor | Class |
|---|---|---|---|
| 6,887,834 B2 | 5/2005 | Nguyen et al. | 507/221 |
| 6,962,200 B2 * | 11/2005 | Nguyen et al. | 166/280.2 |
| 6,978,836 B2 | 12/2005 | Nguyen et al. | 166/295 |
| 6,997,259 B2 | 2/2006 | Nguyen | |
| 7,013,976 B2 | 3/2006 | Nguyen et al. | |
| 7,017,665 B2 | 3/2006 | Nguyen | |
| 7,025,134 B2 | 4/2006 | Byrd et al. | |
| 7,032,667 B2 | 4/2006 | Nguyen et al. | |
| 7,036,589 B2 | 5/2006 | Nguyen | |
| 7,040,403 B2 | 5/2006 | Nguyen et al. | |
| 7,059,406 B2 | 6/2006 | Nguyen | |
| 7,063,150 B2 | 6/2006 | Slabaugh et al. | 166/278 |
| 7,066,258 B2 | 6/2006 | Justus et al. | |
| 7,080,688 B2 | 7/2006 | Todd et al. | |
| 7,081,439 B2 | 7/2006 | Sullivan et al. | |
| 7,104,325 B2 | 9/2006 | Nguyen et al. | |
| 7,114,570 B2 | 10/2006 | Nguyen et al. | |
| 7,153,575 B2 | 12/2006 | Anderson et al. | |
| 7,156,194 B2 | 1/2007 | Nguyen | |
| 7,210,528 B1 | 5/2007 | Brannon et al. | |
| 7,252,146 B2 * | 8/2007 | Slabaugh et al. | 166/280.1 |
| 7,281,581 B2 | 10/2007 | Nguyen et al. | 166/280.2 |
| 2001/0016562 A1 | 8/2001 | Muir et al. | 507/201 |
| 2002/0036088 A1 | 3/2002 | Todd | |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2002/0104217 A1 | 8/2002 | Echols et al. | |
| 2002/0160920 A1 | 10/2002 | Dawson et al. | 507/200 |
| 2002/0169085 A1 | 11/2002 | Miller et al. | |
| 2002/0189808 A1 | 12/2002 | Nguyen et al. | |
| 2003/0006036 A1 | 1/2003 | Malone et al. | 166/250.12 |
| 2003/0013871 A1 | 1/2003 | Mallon et al. | |
| 2003/0060374 A1 | 3/2003 | Cooke, Jr. | 507/200 |
| 2003/0106690 A1 | 6/2003 | Boney et al. | |
| 2003/0114314 A1 | 6/2003 | Ballard et al. | 507/100 |
| 2003/0114317 A1 | 6/2003 | Benton et al. | |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | |
| 2003/0205376 A1 | 11/2003 | Ayoub et al. | 166/254.2 |
| 2003/0230408 A1 | 12/2003 | Acock et al. | 166/297 |
| 2003/0230431 A1 | 12/2003 | Reddy et al. | |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040712 A1 | 3/2004 | Ravi et al. | |
| 2004/0040713 A1 | 3/2004 | Nguyen et al. | 166/295 |
| 2004/0043906 A1 | 3/2004 | Heath et al. | |
| 2004/0045712 A1 | 3/2004 | Eoff et al. | |
| 2004/0048752 A1 | 3/2004 | Nguyen et al. | 507/269 |
| 2004/0055747 A1 | 3/2004 | Lee | 166/278 |
| 2004/0060702 A1 | 4/2004 | Kotlar et al. | |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0152602 A1 | 8/2004 | Boles | |
| 2004/0177961 A1 | 9/2004 | Nguyen et al. | 166/280.2 |
| 2004/0194960 A1 | 10/2004 | Nguyen et al. | |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256097 A1 | 12/2004 | Byrd et al. | |
| 2004/0256099 A1 | 12/2004 | Nguyen et al. | 166/249 |
| 2004/0261993 A1 | 12/2004 | Nguyen | |
| 2004/0261995 A1 | 12/2004 | Nguyen et al. | 166/279 |
| 2004/0261997 A1 | 12/2004 | Nguyen et al. | 166/281 |
| 2004/0261999 A1 | 12/2004 | Nguyen | |
| 2005/0000694 A1 | 1/2005 | Dalrymple et al. | |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0028976 A1 | 2/2005 | Nguyen | |
| 2005/0028979 A1 | 2/2005 | Brannon et al. | 166/280.2 |
| 2005/0034862 A1 | 2/2005 | Nguyen | |
| 2005/0034865 A1 | 2/2005 | Todd et al. | |
| 2005/0045326 A1 | 3/2005 | Nguyen | 166/278 |
| 2005/0045330 A1 | 3/2005 | Nguyen et al. | |
| 2005/0045384 A1 | 3/2005 | Nguyen | |
| 2005/0145385 A1 | 7/2005 | Nguyen | |
| 2005/0173116 A1 | 8/2005 | Nguyen et al. | |
| 2005/0178551 A1 | 8/2005 | Tolman et al. | |
| 2005/0194135 A1 | 9/2005 | Nguyen et al. | |
| 2005/0194136 A1 | 9/2005 | Nguyen et al. | |
| 2005/0194142 A1 | 9/2005 | Nguyen | |
| 2005/0197258 A1 | 9/2005 | Nguyen | |
| 2005/0257929 A1 * | 11/2005 | Nguyen et al. | 166/276 |
| 2005/0263283 A1 | 12/2005 | Nguyen | |
| 2005/0274517 A1 | 12/2005 | Blauch et al. | 166/280.2 |
| 2005/0277554 A1 | 12/2005 | Blauch et al. | 507/224 |
| 2006/0048943 A1 | 3/2006 | Parker et al. | 166/308.1 |
| 2006/0289160 A1 | 12/2006 | van Batenburg et al. | 166/280.1 |

FOREIGN PATENT DOCUMENTS

| | | |
|---|---|---|
| CA | 2063877 | 5/2003 |
| EP | 0313243 B1 | 10/1988 |
| EP | 0528595 A1 | 8/1992 |
| EP | 0506934 | 10/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 | 7/2003 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398460 A1 | 3/2004 |
| EP | 1398640 A1 | 3/2004 |
| EP | 1403466 A2 | 3/2004 |
| EP | 1464789 A1 | 10/2004 |
| EP | 1607572 | 12/2005 |
| GB | 1107584 | 3/1968 |
| GB | 1264180 | 2/1972 |
| GB | 1292718 | 10/1972 |
| GB | 22998440 | 9/1996 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |

| | | |
|---|---|---|
| WO | WO 03/027431 A1 | 4/2003 |
| WO | WO 2004/009956 A1 | 7/2003 |
| WO | WO 2004/009956 | 1/2004 |
| WO | WO 2004/037946 A1 | 5/2004 |
| WO | WO 2004/038176 A1 | 5/2004 |
| WO | WO 2005/021928 A2 | 3/2005 |

OTHER PUBLICATIONS

Halliburton, *SandWedge® NT Conductivity Enhancement System, Enhances Proppant Pack Conductivity and Helps Prevent Intrusion of Formation Material for Improved Long-Term Production*, Stimulation, HO2289 05/04, 2004, Halliburton Communications.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, *"Water and Gas Cyclic Pulsing Method for Improved Oil Recovery"*, SPE 3005, 1971.

Peng et al., *"Pressure Pulsing Waterflooding in Dual Porosity Naturally Fractured Reservoirs"* SPE 17587, 1988.

Dusseault et al, *"Pressure Pulse Workovers in Heavy Oil"*, SPE 79033, 2002.

Yang et al., *"Experimental Study on Fracture Initiation By Pressure Pulse"*, SPE 63035, 2000.

Nguyen et al., *New Guidelines For Applying Curable Resin-Coated Proppants*, SPE Paper, No. 39582, 1997.

Kazakov et al., *"Optimizing and Managing Coiled Tubing Frac Strings"* SPE 60747, 2000.

Advances in Polymer Science, vol. 157, *"Degradable Aliphatic Polyesters"* edited by A.-C. Alberston, 2001.

Gorman, *Plastic Electric: Lining up the Future of Conducting Polymers* Science News, vol. 163, May 17, 2003.

Gidley et al., *"Recent Advances in Hydraulic Fracturing,"* Chapter 6, pp. 109-130, 1989.

Simmons et al., *"Poly(phenyllactide): Synthesis, Characterization, and Hydrolytic Degradation, Biomacromolecules"*, vol. 2, No. 2, pp. 658-663, 2001.

Yin et al., *"Preparation and Characterization of Substituted Polylactides"*, Americal Chemical Society, vol. 32, No. 23, pp. 7711-7718, 1999.

Yin et al., *"Synthesis and Properties of Polymers Derived from Substituted Lactic Acids"*, American Chemical Society, Ch.12, pp. 147-159, 2001.

Cantu et al., *"Laboratory and Field Evaluation of a Combined Fluid-Loss Control Additive and Gel Breaker for Fracturing Fluids,"* SPE 18211, 1990.

Love et al., *"Selectively Placing Many Fractures in Openhole Horizontal Wells Improves Production"*, SPE 50422, 1998.

McDaniel et al. *"Evolving New Stimulation Process Proves Highly Effective In Level 1 Dual-Lateral Completion"* SPE 78697, 2002.

Albertsson et al., *"Aliphatic Polyesters: Synthesis, Properties and Applications"*, Advances in Polymer Science, vol. 57 Degradable Aliphatic Polyesters, 2002.

Dechy-Cabaret et al., *"Controlled Ring-Operated Polymerization of Lactide and Glycolide"* American Chemical Society, Chemical Reviews, A-Z, AA-AD, 2004.

Funkhouser et al., *"Synthetic Polymer Fracturing Fluid For High-Temperature Applications"*, SPE 80236, 2003.

*Chelating Agents*, Encyclopedia of Chemical Technology, vol. 5 (764-795).

Vichaibun et al., *"A New Assay for the Enzymatic Degradation of Polylactic Acid, Short Report"*, ScienceAsia, vol. 29, pp. 297-300, 2003.

CDX Gas, CDX Solution, 2003, CDX, LLC, Available @ www.cdxgas.com/solution.html, printed pp. 1-2.

CDX Gas, *"What is Coalbed Methane?"* CDX, LLC. Available @ www.cdxgas.com/what.html, printed p. 1.

Halliburton brochure entitled "H2Zero™ Service Introducing The Next Generation of cost-Effective Conformance Control Solutions", 2002.

Halliburton brochure entitled INJECTROL® A Component, 1999.
Halliburton brochure entitled "INJECTROL® G Sealant", 1999.
Halliburton brochure entitled "INJECTROL® IT Sealant", 1999.
Halliburton brochure entitled "INJECTROL® Service Treatment", 1999.
Halliburton brochure entitled "INJECTROL® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages.

Halliburton, *CoalSlim$^{SM}$ Service, Helps Boost Cash Flow From CBM Assets*, Stimulation, HO3679 10/03, 2003, Halliburton Communications.

Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 05/04, 2004, Halliburton Communications.

Halliburton Technical Flier—Multi Stage Frac Completion Methods, 2 pages.

Halliburton *"CobraFrac$^{SM}$ Service, Coiled Tubing Fracturing—Cost-Effective Method for Stimulating Untapped Reserves"*, 2 pages, 2004.

Halliburton *"CobraJetFrac$^{SM}$ Service, Cost-Effective Technology That Can Help Reduce Cost per BOE Produced, Shorten Cycle time and Reduce Capex"*.

Halliburton Cobra Frac Advertisement, 2001.

Halliburton *"SurgiFrac$^{SM}$ Service, a Quick and cost-Effective Method to Help Boost Production From Openhole Horizonal Completions"*, 2002.

Foreign Search Report and Opinion (CPW 21582 EP), Mar. 11, 2005.
Notice of Allowance in U.S. Appl. No. 11/000,806, Aug. 13, 2007.
Office Action in U.S. Appl. No. 11/000,806, May 18, 2007.
Office Action in U.S. Appl. No. 11/000,806, Nov. 2, 2006.
Notice of Allowance in U.S. Appl. No. 11/513,923, Nov. 28, 2007.
Office Action in U.S. Appl. No. 11/513,923, Apr. 30, 2007.
U.S. Appl. No. 12/080,647, filed Apr. 4, 2008, Dalrymple et al.
"Santrol Bioballs"; http://www.fairmounminerals.com/.sub.-SANTROL/SANTROL%20Web%20Site/B.sub-.-TD.htm. cited by other.

International Search Report and Opinion (PCT/GB2004/002412).
International Search Report and Opinion (PCT/GB2004/002948).
Paccaloni, et al., "Key Factors for Enhanced Results of Matrix Stimulation Treatmets," SPE 17154.
Paccaloni, et al., "Advances in Matrix Stimulation Technology," SPE 20623.
Nguyen, et al., Controlling Proppant Flowback in High-Temperature, High-Production Wells, SPE 82215.
Dusterhoft, et al., "Maximizing Effective Proppant Permeability Under High-Stress, High Gas-Rate Conditions," SPE 90398.

\* cited by examiner

ON-THE-FLY PREPARATION OF PROPPANT AND ITS USE IN SUBTERRANEAN OPERATIONS

BACKGROUND OF THE INVENTION

The present invention relates to methods for preparing proppants and using such proppants in subterranean applications. More particularly, the present invention relates to methods for making proppant on-the-fly during subterranean treatment operations.

Servicing fluids comprising proppant are used in a variety of operations and treatments performed in oil and gas wells. Such operations and treatments include, but are not limited to, well completion operations such as fracturing, gravel packing, or frac-packing.

An example of a production stimulation operation using a servicing fluid having proppant suspended therein is hydraulic fracturing. Hydraulic fracturing generally comprises pumping a fracturing fluid into a subterranean zone at a rate and pressure such that fractures are formed and/or enhanced in the subterranean zone. The fracture or fractures may be horizontal or vertical, with the latter usually predominating, and with the tendency toward vertical fractures increasing with the depth of the formation being fractured. Fracturing fluids known in the art may be gels, emulsions, or foams. As the fracturing treatment progresses, the proppant is deposited in the fracture and functions, inter alia, to hold the fracture open while maintaining conductive channels through which produced fluids can flow upon completion of the fracturing treatment and release of the attendant hydraulic pressure.

Servicing fluids, such as fracturing fluids, generally should be very viscous to enable them to carry the slurried particulates into the subterranean formation. Generally, the servicing fluids are made viscous by that addition of suitable viscosifying agents, which usually are polymeric materials. These viscosifying agents may be and often are crosslinked to further increase the fluids viscosity.

Proppant is typically bulky and weighty, resulting in high storage and transportation costs to get the proppant to the well site. Moreover, once the proppant is delivered to the well site, the proppant requires space and storage resources until the proppant is used. As proppant typically contains numerous open-spaces between individual particulates, such storage is inherently inefficient. Equipment used to deliver proppant into a subterranean formation typically is large and capital intensive.

Stored proppant may also have a tendency to degrade and be unable to maintain a uniform desired size and strength. During the transportation, storage, and use of the proppant, proppant may be crushed and broken to form proppant particulates of variable sizes. This is undesirable when a subterranean application requires a proppant of a specific size and strength. Another drawback of when the proppant is crushed is that it forms fines. Fines are particulates that are small enough that occupy and plug up the pore spaces within the proppant matrix, which in turn reduces the potential production of the well.

SUMMARY OF THE INVENTION

The present invention relates to methods for preparing proppants and using such proppants in subterranean applications. More particularly, the present invention relates to methods for making proppant on-the-fly during subterranean treatment operations.

Some embodiments of the present invention provide methods of preparing proppant on-the-fly comprising providing discrete amounts of a resin mixture that comprises a resinous material and a filler material; placing the discrete amounts of resin mixture into a well bore comprising a treatment fluid; and, allowing the discrete amounts of the resin mixture to substantially cure and form proppant particles while inside the treatment fluid.

Other embodiments of the present invention provide methods of fracturing a portion of a subterranean formation using proppant prepared on-the-fly comprising placing a treatment fluid into a well bore penetrating the subterranean formation at a pressure sufficient to create or enhance a fracture in the portion of the subterranean formation; providing discrete amounts of a resin mixture that comprises a resinous material and a filler material; placing the discrete amounts of a resin mixture into the well bore containing the treatment fluid; and, allowing the discrete amounts of the resin mixture to substantially cure and form proppant particles while inside the treatment fluid.

The features and advantages of the present invention will be readily apparent to those skilled in the art upon a reading of the description of the preferred embodiments that follows.

DESCRIPTION OF PREFERRED EMBODIMENTS

The present invention relates to methods for preparing proppants and methods of using such proppants in subterranean applications. More particularly, the present invention relates to methods for making proppants from a resin mixture on-the-fly during subterranean treatment operations.

The methods of the present invention generally comprise the steps of providing a resin mixture comprising a resinous material and a filler material; heating the resin mixture; creating discrete amounts of resin mixture and placing them into a well bore containing a treatment fluid; and, allowing the discrete amounts of the resin mixture to substantially cure and form while inside the well bore.

The resin mixture is divided into discrete amounts so as to form pellets that are capable of curing to form proppant. The pellets may be extruded in various sizes and shapes by controlling the extrusion rate and/or altering the molds and dies used on the extrusion device. In exemplary embodiments of the present invention, the pellet shape may be substantially spherical. The term "spherical" as used in this invention will designate pellets having an average ratio of minimum diameter to maximum diameter of about 0.7 or greater. In certain exemplary embodiments, the pellet may be extruded into other shapes including ovals and amorphous shapes. Other shapes may be more desirable for their flowback control properties. One skilled in the art, with the benefit of this disclosure, will recognize the appropriate size and shape for a given application.

In some embodiments of the present invention, the resin mixture is heated and extruded into a treatment fluid in a well bore. Heating the mixture, inter alia, reduces the viscosity of the mixture and makes the mixture easier to extrude. The amount of heating necessary depends on the thermosetting material chosen. One skilled in the art will realize an appropriate temperature to heat the mixture. The mixture may also be heated to an elevated temperature (that is, a temperature higher than that required for extrusion) so as to elongate the time needed for the mixture to cure once it exits the extruder.

It should be recognized that extrusion is not the only acceptable method of forming discrete amounts of the resin mixture. For example, the resin mixture might be atomized into the well bore containing the treatment fluid, or might be dropped through a sieve device into the well bore containing the treatment fluid. Any method capable of transferring the heated resin mixture into the well bore in the form of discrete droplets is suitable for use in the present invention.

When discrete amounts of the resin mixture are placed into a well bore filled with treatment fluid, they continue to or begin to cure. Because of the inherent thermosetting properties of the resins of the present invention, as the discrete amounts cure, they harden to form proppant. The proppant is therefore produced "on-the-fly" because the proppant does not form until the discrete amounts are added to the treatment fluid and have time to cure and harden as they proceed down the well bore. In some embodiments of the present invention, the discrete amounts are caused to harden by the presence of a hardener or activator included within the carrier fluid itself. In other embodiments of the present invention, additional equipment may be used between the extruder and the well bore. For example, it may be desirable to extrude the mixture in strings or lines that are flash cooled to form solids and then cut or crushed into appropriate shapes and sizes before being dropped into the well bore filled with treatment fluid to complete the curing process. Alternatively, the extruded mixture may drop onto a rotating table and be formed into substantially spherical particles that are then dropped into the well bore filled with treatment fluid to complete the curing process.

Resins suitable for use in the present invention are generally thermosetting and/or Thermoplastic materials. Thermoplastic materials may be extruded from a liquid form at an elevated temperature, then, as they cool, they harden and form into a solid material. In certain exemplary embodiments of the present invention, the resin comprises thermoplastic materials including, but not limited to, polystyrene, polyvinylbenzene, polyolefins, polystyrene divinylbenzene, polyfluorocarbons, polyether etherketones, polyamide imides and mixtures thereof. In other certain exemplary embodiments of the present invention, the resin is a one-component curable resin that does not require the use of an external catalyst to cure. Suitable such resin include, but are not limited to, acrylic-based resins, two-component epoxy-based resins, furan-based resins, phenolic-based resins, high-temperature (HT) epoxy-based resins, phenol/phenol formaldehyde/furfuryl alcohol resins, and combinations thereof.

Selection of a suitable resin may be affected by the temperature of the subterranean formation to which the fluid will be introduced. By way of example, for subterranean formations having a bottom hole static temperature ("BHST") ranging from about 60° F. to about 250° F., either thermoplastic materials or two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

One type of resin suitable for use in the methods of the present invention is an acrylic-based resin. Suitable acrylic-based resins include, but are not limited to, ethyl acrylate, methyl methacrylate, n-butyl methylacryate, and mixtures thereof. Acrylic-based resins suitable for use in the present invention may further comprise an initiator to initiate and cause the polymerization of these acrylic-based resins. Suitable initiators include, but not limited to, benzoyl peroxide, 2,2'-azo-bis-isobutyrylnitrile, and combinations thereof.

Another resin suitable for use in the methods of the present invention is a two-component epoxy based resin comprising a hardenable resin component and a hardening agent component. The hardenable resin component is comprised of a hardenable resin and an optional solvent. The second component is the liquid hardening agent component, which is comprised of a hardening agent, a silane coupling agent, a surfactant, an optional hydrolyzable ester for, inter alia, breaking gelled fracturing fluid films on the proppant particles, and an optional liquid carrier fluid for, inter alia, reducing the viscosity of the liquid hardening agent component. It is within the ability of one skilled in the art with the benefit of this disclosure to determine if and how much liquid carrier fluid is needed to achieve a viscosity suitable to the subterranean conditions.

Examples of hardenable resins that can be used in the liquid hardenable resin component include, but are not limited to, organic resins such as bisphenol A-epichlorohydrin resins, polyepoxide resins, novolak resins, polyester resins, phenol-aldehyde resins, urea-aldehyde resins, furan resins, urethane resins, glycidyl ethers and mixtures thereof. The resin used is included in the liquid hardenable resin component in an amount sufficient to form sufficient proppant for the particular application. In some embodiments of the present invention, the resin used is included in the liquid hardenable resin component in the range of from about 70% to about 100% by weight of the liquid hardenable resin component.

Examples of the hardening agents that can be used in the liquid hardening agent component of the two-component epoxy-based resin of the present invention include, but are not limited to, amines, aromatic amines, polyamines, aliphatic amines, cyclo-aliphatic amines, amides, polyamides, 2-ethyl-4-methyl imidazole and 1,1,3-trichlorotrifluoroacetone. Selection of a preferred hardening agent depends, in part, on the temperature of the formation in which the hardening agent will be used. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl) phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. The hardening agent used is included in the liquid hardening agent component in an amount sufficient to consolidate the hardenable resin. In some embodiments of the present invention, the hardening agent used is included in the liquid hardenable resin component in the range of from about 40% to about 60% by weight of the liquid hardening agent component.

Another resin suitable for use in the methods of the present invention is a furan-based resin. Suitable furan-based resins include, but are not limited to, furfuryl alcohol resins, mixtures furfuryl alcohol resins and aldehydes, and a mixture of furan resins and phenolic resins.

Still another resin suitable for use in the methods of the present invention is a phenolic-based resin. Suitable phenolic-based resins include, but are not limited to, terpolymers of phenol, phenolic formaldehyde resins, and a mixture of phenolic and furan resins.

Another resin suitable for use in the methods of the present invention is a HT epoxy-based resin. Suitable HT epoxy-based components include, but are not limited to, bisphenol A-epichlorohydrin resins, polyepoxide resins, novolac resins, polyester resins, glycidyl ethers and mixtures thereof. A HT epoxy-based resin may be combined with a solvent to control viscosity if desired. Suitable solvents for use with the HT epoxy-based resins of the present invention are those solvents capable of substantially dissolving the HT epoxy-resin chosen for use in the resin. Such solvents include, but are not limited to, dimethyl sulfoxide and dimethyl formamide. A co-solvent such as a dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene and fatty acid methyl esters, may also be used in combination with the solvent.

Yet another resin suitable for use in the methods of the present invention is a phenol/phenol formaldehyde/furfuryl alcohol resin comprising from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, 3-glycidoxypropyltrimethoxysilane, and n-beta-(aminoethyl)-gamma-aminopropyl trimethoxysilane. Suitable surfactants include, but are not limited to, an ethoxylated nonyl phenol phosphate ester, mixtures of one or more cationic surfactants, and one or more non-ionic surfactants and an alkyl phosphonate surfactant. Suitable solvents for use in the phenol/phenol formaldehyde/furfuryl alcohol resins of the present invention include, but are not limited to 2-butoxy ethanol, butyl acetate, and furfuryl acetate.

Fillers suitable for use in the present invention generally comprise any material that is suitable for adding structural strength to the extruded proppant particle. In certain exemplary embodiments of the present invention, filler may comprise silicon carbide, carbon black, fumed silica, fly ash, microspheres, or combinations thereof. Silicon carbides, fumed silica may include any silicon-carbon complex including, but not limited to silicone polycarbonate urethane. One suitable commercially available fumed silica is Carb-O-Sil™ (US Composites, West Palm Beach, Fla.).

Carbon black is a powdered form of a highly dispersed elemental carbon manufactured by controlled vapor-phase pyrolysis of hydrocarbons. There are a number of different types of carbon black, produced by different industrial processes, including acetylene black, channel black, furnace black, lamp black and thermal black. Average particle diameters in several commercially-produced carbon blacks range from 0.01 to 0.4 micrometers ($\mu m$), while average aggregate diameters range from 0.1 to 0.8 $\mu m$. Most types of carbon black contain over 97 to 99% elemental carbon. Carbon blacks may also contain chemically bound hydrogen, oxygen, nitrogen and sulfur. Because of their source materials, the methods of their production and their large surface areas and surface characteristics, commercial carbon blacks typically contain varying quantities of adsorbed by-products from the production processes, particularly aromatic compounds. A suitable carbon black is commercially available under trade names BLACK PEARLS, ELFTEX, VULCAN, MOGUL, MONARCH, EMPORER, REGAL, UNITED, SPHERON and STERLING, Cabot Corp., Alpharetta, Ga.

In some embodiments of the present invention, the filler may comprise "fly ash." Fly ash, as referred to herein, refers to a finely divided residue resulting from the combustion of carbonaceous material, such as ground or powdered coal, and generally carried by generated flue gases. One preferred fly ash is ASTM class F fly ash, having a Blaine fineness of about 10,585 square centimeters per gram and commercially available from Halliburton Energy Services, Inc., of Houston, Tex., under the trade designation "POZMIX®." Another preferred fly ash is ASTM class C high-lime fly ash produced from combustion of low-sulfur, sub-bituminous coal that originated from the Powder River Basin near Gillette, Wyo. Low carbon, high calcium content and self-cementitious properties characterize this fly ash. In other embodiments of the present invention, the combustion product may comprise "bottom ash." Bottom ash, as referred to herein, refers to a finely divided residue resulting from the combustion of carbonaceous material and generally accumulating on the floor of an incinerator.

In some embodiments of the methods of the present invention, the filler used is a non-porous microsphere. Such microspheres may be obtained from any suitable source. Particularly suitable microspheres are cenospheres, which are hollow microspheres formed as an industrial waste by-product, and which are commercially available from, for example, Halliburton Energy Services, Inc., of Duncan, Okla., under the tradename "SPHERELITE." Generally speaking, the micro-material may be included with the resin in the amount suitable to reduce the density of the mixture and strengthen the proppant.

In some embodiments of the present method, the filler is present in an amount from about 5% to about 90% by weight of the mixture. In certain exemplary embodiments, the filler material is present in an amount from about 30% to about 65% by weight of the mixture.

The methods of the present invention further comprise a treatment fluid. The treatment fluid may generally comprise any servicing fluid operable for use in subterranean applications. The treatment fluid may be oleaginous, aqueous or an emulsion. Treatment fluids, such as fracturing fluid, gravel packing fluid, and frac-packing fluids are well known in the art an it is within the ability of one skilled in the art to select a suitable treatment fluid.

Some methods of the present invention provide methods of fracturing a subterranean formation comprising the steps of providing a treatment fluid, providing a mixture containing a resin and a filler, placing the treatment fluid into a well bore penetrating a subterranean formation at a pressure sufficient to create or enhance at least one fracture in the subterranean formation, extruding the mixture into the treatment fluid, allowing the portion of the mixture extruded into the treatment fluid to substantially cure.

To facilitate a better understanding of the present invention, the following examples of preferred embodiments are given. In no way should the following examples be read to limit the scope of the invention.

EXAMPLE 1

Commercial yarn (100% acrylic) was first dissolved in dimethyl formamide (10% by weight). The solution was then extruded slowly through a 20-gauge needle (or bigger sizes) which has been attached to a 5-mL plastic syringe. Droplets of acrylic-DMF solution were extruded into a 100-mL glass graduate cylinder containing 2% KCl brine and allowed to fall freely by gravity. It was observed that as soon as the acrylic-DMF droplet was in contact with the brine, the DMF was extracted out from the droplet, allowing the acrylic polymer to shrink into a smaller volume. The droplet conformed to a final shape depending on where it was injected into the brine. A spherical shape was obtained if the droplet was dropped on top of the brine and allowed to fall by itself. A tear or hook shape was obtained if the droplet was introduced within the brine (i.e. the outlet of the needle was immersed in the brine). It was also observed that the larger the outlet of the needle, the larger the droplets or beads of acrylic polymer can be obtained. In addition, the acrylic beads transformed from soft particles into hard particles with time. Bead sizes obtained were around 1 mm or less.

EXAMPLE 2

Commercial yarn (100% acrylic) was first dissolved in dimethyl formamide (10% by weight). Carbon black powder in the amount of 10% by weight of the acrylic-DMF solution was mixed in to form a homogeneous solution. Carbon black was used a filler, either to enhance the toughness of the bead or to help achieve the desired particle density. The black acrylic beads were obtained in similar manners as described in Example 1.

Thus, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims. fortuitous

What is claimed is:

1. A method of fracturing a portion of a subterranean formation using proppant prepared on-the-fly comprising:
   placing a treatment fluid into a well bore penetrating a subterranean formation at a pressure sufficient to create or enhance a fracture in a portion of the subterranean formation;
   providing discrete amounts of a resin mixture that comprises a resinous material and a filler material, wherein the resin mixture comprises from about 5% to about 90% filler material by weight, and wherein the discrete amounts of the resin mixture comprise a plurality of filler material particles;
   placing the discrete amounts of the resin mixture into the well bore containing the treatment fluid; and,
   allowing the discrete amounts of the resin mixture to substantially cure and form proppant particles while inside the treatment fluid.

2. The method of claim 1 wherein the resin comprises an acrylic-based resin.

3. The method of claim 2 wherein the acrylic-based resin further comprises an initiator.

4. The method of claim 3 wherein the initiator comprises at least one initiator selected from the group consisting of: benzoyl peroxide, 2,2'-azo-bis-isobutyrylnitrile, or a combination thereof.

5. The method of claim 2 wherein the acrylic-based resin comprises at least one acrylic-based resin selected from the group consisting of an ethyl acrylate, a methyl methacrylate, a n-butyl methylacryate, and a mixture thereof.

6. The method of claim 1 wherein the resinous material comprises a thermosetting resin.

7. The method of claim 1 wherein the resinous material comprises at least one thermoplastic resin selected from the group consisting of a polystyrene, a polyolefin, a polystyrene divinylbenzene, a polyfluorocarbon, a polyether etherketone, a polyamide imide, and a mixture thereof.

8. The method of claim 1 wherein the resin comprises at least one resin selected from the group consisting of a two-component epoxy-based resin, a furan-based resin, a phenolic-based resin, a high-temperature epoxy-based resin, a phenol/phenol formaldehyde/furfuryl alcohol resin, and a combination thereof.

9. The method of claim 1 wherein the mixture comprises from about 30% to about 65% filler material by weight.

10. The method of claim 1 wherein the cured proppant is substantially spherical.

11. The method of claim 1 wherein the discrete amounts of resin mixture are created by extrusion.

12. The method of claim 1 wherein the discrete amounts of resin mixture are created by sieving the resin mixture into the treatment fluid.

13. The method of claim 1 wherein the filler material comprises at least one filler material selected from the group consisting of a silicon carbide, a carbon black, a fumed silica, a fly ash, a microsphere, and a combination thereof.

14. The method of claim 1 wherein the step of providing discrete amounts of the resin mixture comprises heating the resin mixture and then creating a plurality of discrete amounts of the heated resin mixture.

15. The method of claim 1 wherein the step of providing discrete amounts of the resin mixture comprises atomizing the resin mixture so as to create a plurality of discrete amounts of the resin mixture.

16. A method of fracturing a portion of a subterranean formation using proppant prepared on-the-fly comprising:
   placing a treatment fluid into a well bore penetrating a subterranean formation at a pressure sufficient to create or enhance a fracture in a portion of the subterranean formation;
   providing a resin mixture that comprises a resinous material and a filler material wherein the resin mixture comprises from about 5% to about 90% filler material by weight;
   extruding the resin mixture so as to create discrete amounts of the resin mixture;
   placing the discrete amounts of the resin mixture into the well bore containing the treatment fluid; and,
   allowing the discrete amounts of the resin mixture to substantially cure and form proppant particles while inside the treatment fluid.

17. The method of claim 16 wherein the resinous material comprises a thermosetting resin.

18. The method of claim 16 wherein the resin comprises at least one resin selected from the group consisting of a two-component epoxy-based resin, a furan-based resin, a phenolic-based resin, a high-temperature epoxy-based resin, a phenol/phenol formaldehyde/furfuryl alcohol resin, and a combination thereof.

19. The method of claim 16 wherein the resin comprises an acrylic-based resin.

20. The method of claim 16 wherein the mixture comprises from about 30% to about 65% filler material by weight.

21. A method of using proppant prepared on-the-fly comprising:
   placing a treatment fluid into a well bore penetrating a subterranean formation at a pressure sufficient to create or enhance a fracture in a portion of the subterranean formation;
   providing a resin mixture that comprises a resinous material and a filler material wherein the resin mixture comprises from about 5% to about 90% filler material by weight;
   passing the resin mixture through a sieve so as to create discrete amounts of the resin mixture;
   placing the discrete amounts of the resin mixture into the well bore containing the treatment fluid; and,
   allowing the discrete amounts of the resin mixture to substantially cure and form proppant particles while inside the treatment fluid.

22. The method of claim 21 wherein the resinous material comprises a thermosetting resin.

23. The method of claim 21 wherein the resin comprises at least one resin selected from the group consisting of a two-component epoxy-based resin, a furan-based resin, a phenolic-based resin, a high-temperature epoxy-based resin, a phenol/phenol formaldehyde/furfuryl alcohol resin, and a combination thereof.

24. The method of claim 21 wherein the resin comprises an acrylic-based resin.

25. The method of claim 21 wherein the mixture comprises from about 30% to about 65% filler material by weight.

* * * * *